Patented Nov. 29, 1932

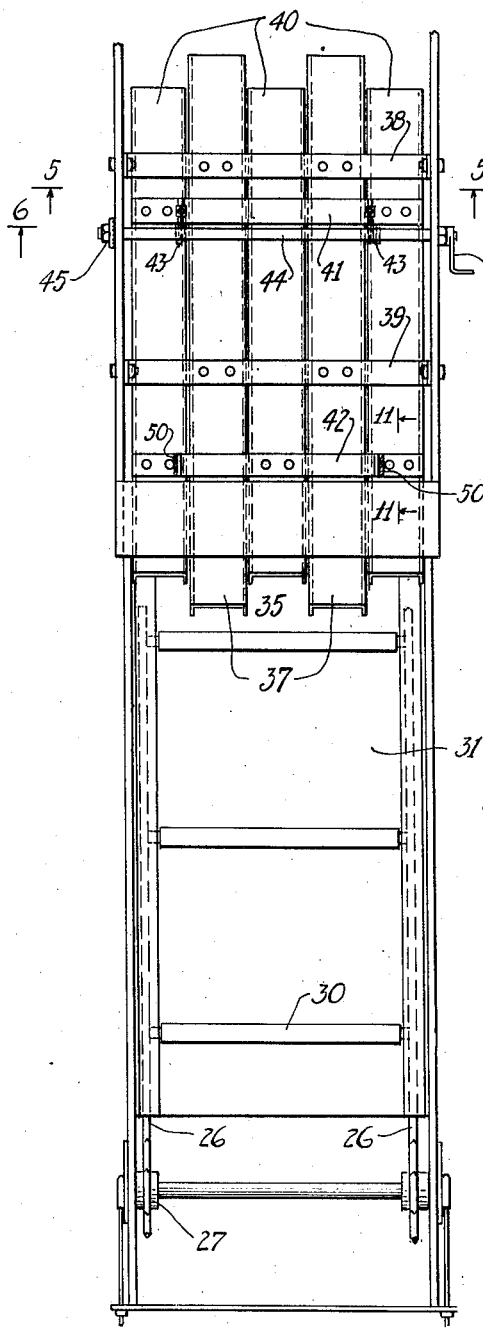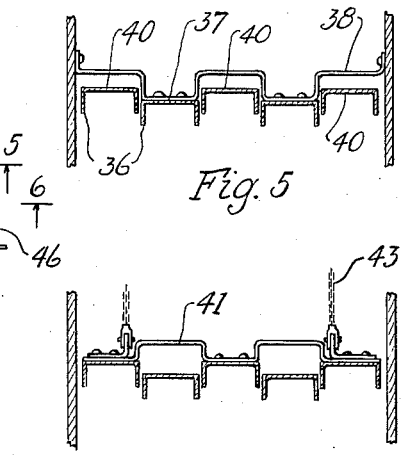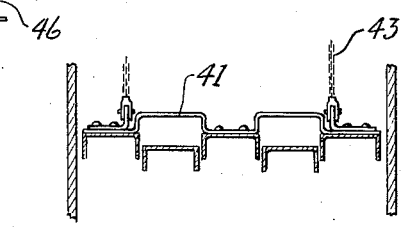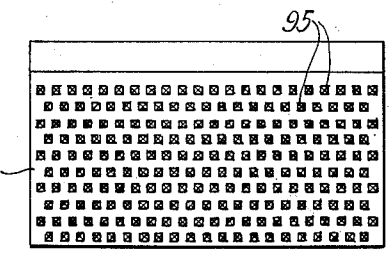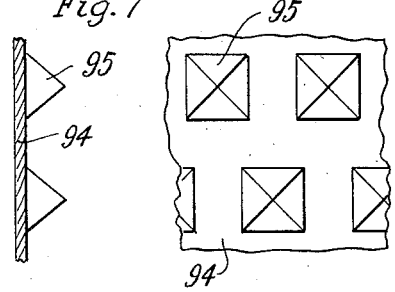

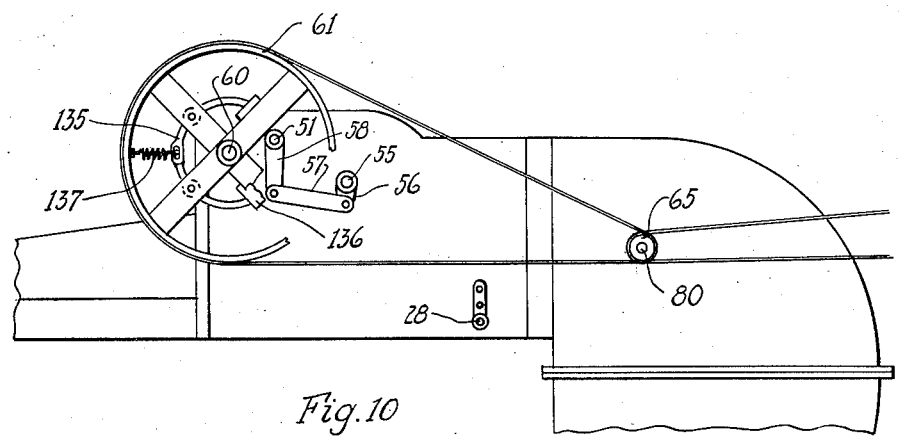
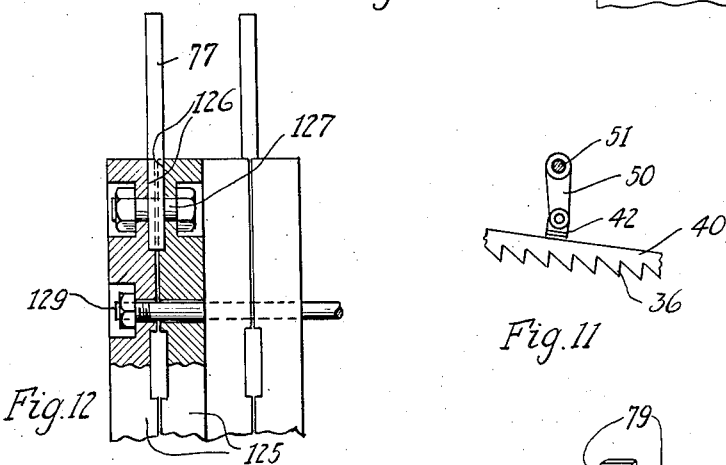
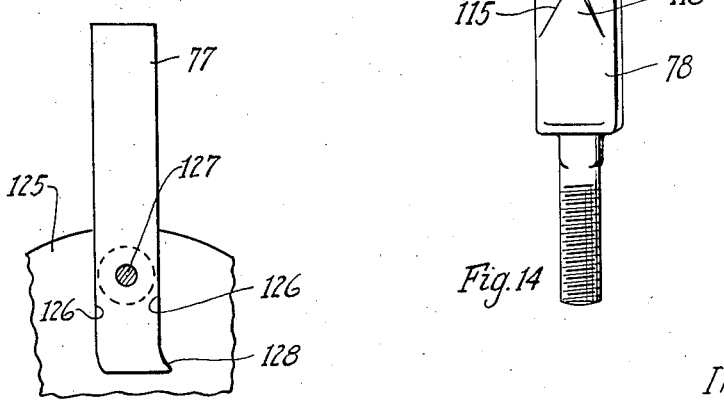

1,889,183

UNITED STATES PATENT OFFICE

JOSEPH E. ROSENFELD, OF OMAHA, NEBRASKA, ASSIGNOR TO BADGER EQUIPMENT COMPANY, OF OMAHA, NEBRASKA, A CORPORATION OF NEBRASKA

COMBINED GRAIN AND ROUGHAGE MILL

Application filed December 22, 1927. Serial No. 241,800.

This invention relates to grain and roughage mills and it has for its object the production of a machine for grinding roughage, such as hay, straw or stalks, and also for grinding grain, including corn, shelled or not, and also for grinding the grain and the roughage together when desired. The general purpose of the machine is to provide a combination mill which can be used for these various purposes and which will hull the grain when desired and will cut or grind the various substances as finely as may be desired.

Another object of the invention is to provide improved means for feeding the substances to be shredded or ground so as to feed at the proper rate and to prevent clogging of the machine.

Figure 1:
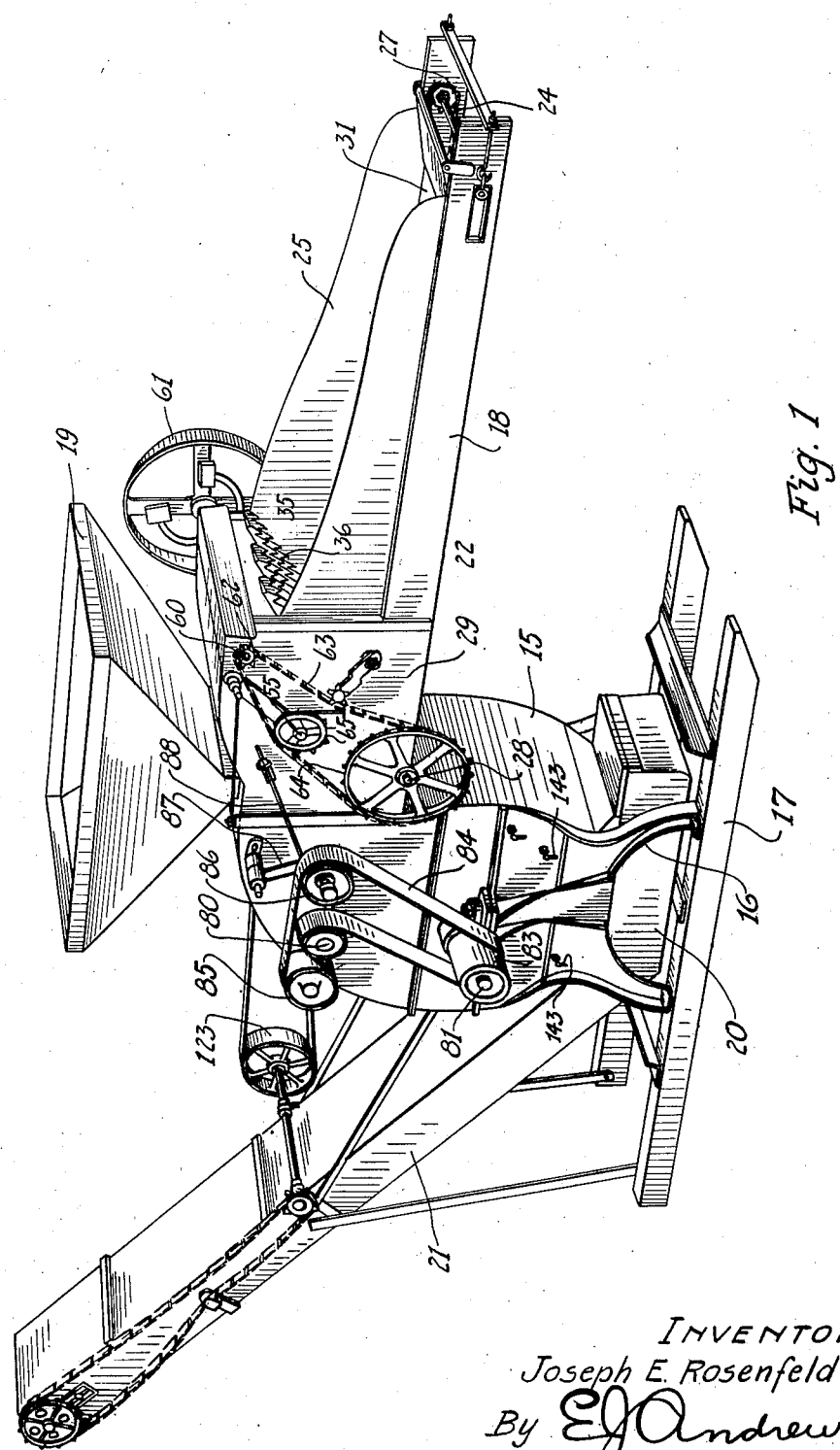
Figure 2:
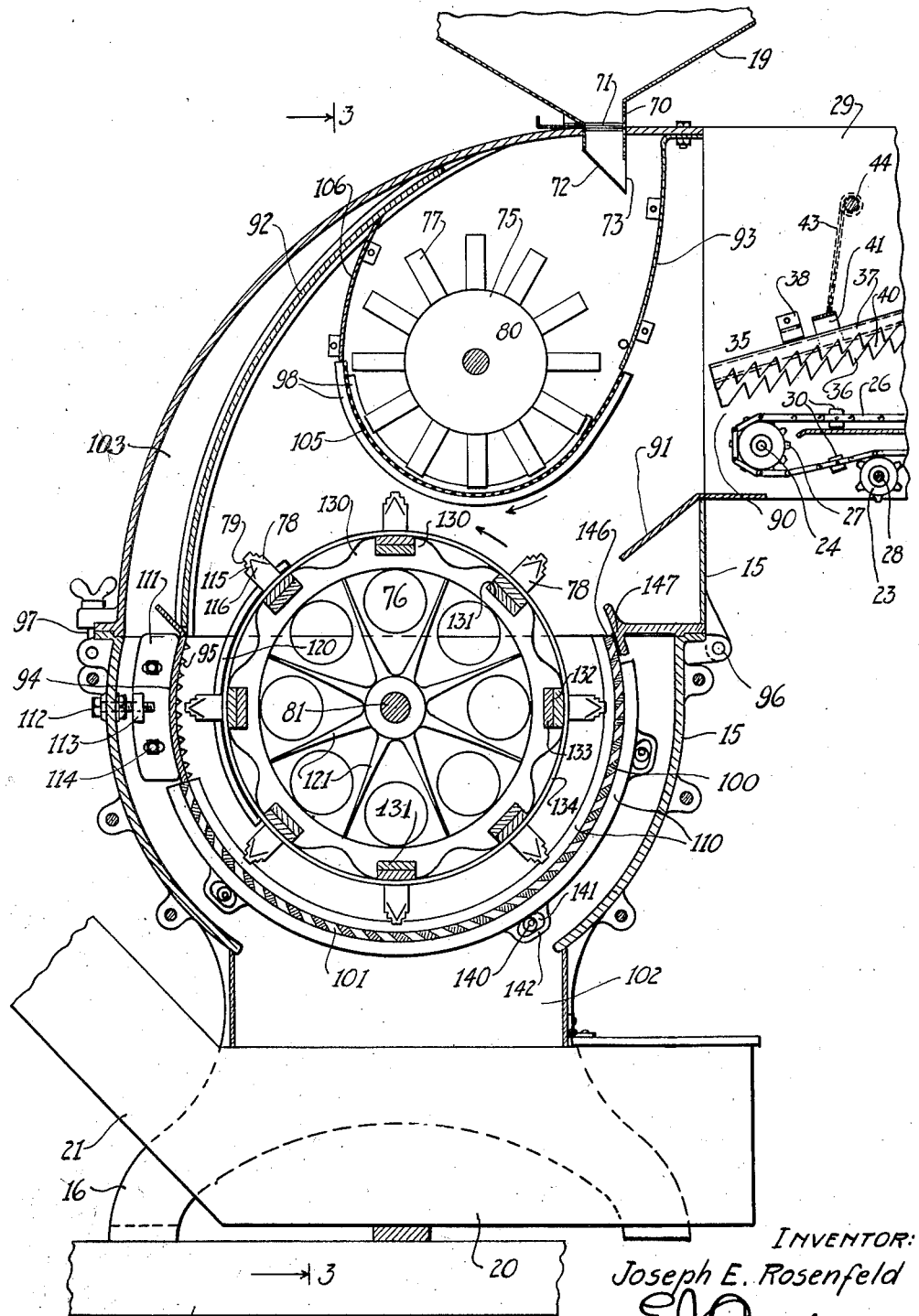
Figure 3:
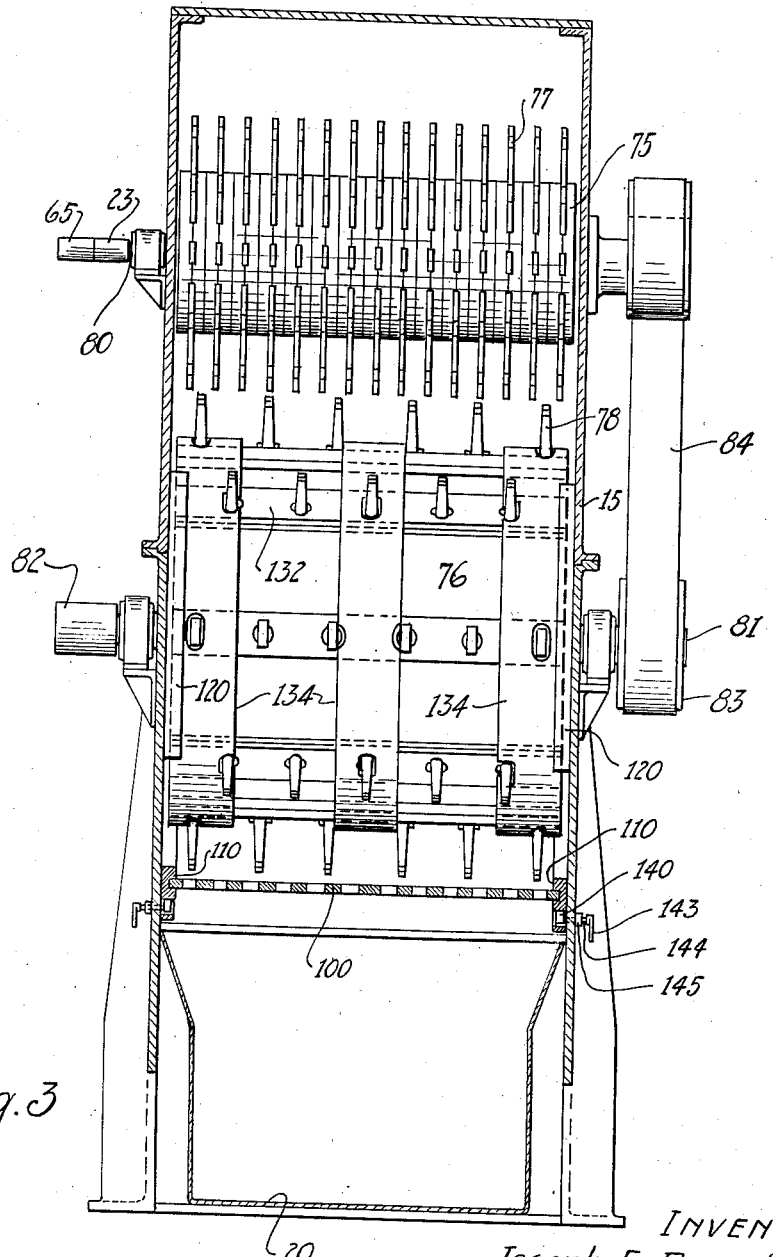

Another object is to provide special devices for carrying out the purposes of the machine and for improving old devices so as to more completely and evenly grind the substances with the minimum amount of power and to eliminate sources of injury to the apparatus and also to eliminate the tendency for the substances being operated on to wind around various moving parts or otherwise clog or interfere with the operation of the machine. Other objects of the invention will be understood from a consideration of the accompanying drawings and the following description thereof:

Of the drawings, Fig. 1 is a perspective elevation of a machine which embodies, in the preferred form, the features of my invention; Fig. 2 is a vertical central sectional view of the main body of the machine; Fig. 3 is a vertical sectional view of the machine along the line 3—3 of Fig. 2; Fig. 4 is a plan view of the feeding mechanism of the machine with the cover thereof removed; Figs. 5 and 6 are transverse sectional views of the feeder along the respective lines 5—5 and 6—6 of Fig. 4; Fig. 7 is an elevation of one of the grinding elements of the machine; Fig. 8 is an enlarged fractional view of Fig. 7; Fig. 9 is an edge view of Fig. 8; Fig. 10 is a fractional elevation of the feeding mechanism showing the driving means; Fig. 11 is a detail view of the means for oscillating the feeding mechanism along the line 11—11 of Fig. 4; Fig. 12 is a fractional elevation, partly in section, of elements of one of the cylinders of the machine; Fig. 13 is a corresponding side view of a portion of the cylinder; and Fig. 14 is an enlarged perspective view of a tooth of the other cylinder.

The mill comprises a casing 15, the walls of which provide means for supporting the various elements of the mill. The casing is supported in any suitable manner such as by legs 16 resting upon planks 17. These planks form means for supporting the mill and they also provide convenient means for moving the mill from one place to another. Mounted on the casing 15 is the frame 18 of the feeding chute 22 into which the rougher substances are placed when fed to the mill, and on top of the casing 15 is a hopper 19 in which finer substances, such as grain, are fed to the grinding elements of the mill. Within the casing 15 is the grinding chamber, in which are properly mounted and arranged various devices hereinafter described for shredding, cutting, grinding, hulling, mashing, and the like, such material as is fed into the casing. From the casing the material, properly operated on, passes downwardly into a hopper 20 and from there it is carried by an elevator 21 upwardly and passed into a wagon or other receptacle, or, if desired, it is run from the elevator into bags or other containers. The elevator is operated by a wheel 123 belted to a pulley 23 mounted on the shaft 80.

The feeding mechanism for the coarser material may be any suitable means for feeding such material into the grinding chamber. I prefer for the purpose the chute 22 which is formed by the frame 18 and the side boards 25. Properly guiding the material within the chute are chain belts 26, supported by idle wheels 27 on the shafts 24. The belts are operated by means of a shaft 28 mounted in bearings fixed to the box 29, which comprises the inner end of the chute 18. Mounted on the shaft 28 are ordinary sprocket-wheels 23 which drive the chain belts 26. Cleats 30 are fastened by their ends to the respective chain belts and as the cleats slide along the bottom 31 of the chute the material is carried forwardly towards the operating mechanism in the casing 15.

To assist in feeding the material into the casing, I provide fish-backs 35 mounted in the box 29. These fish-backs comprise inverted trough shaped bars, and on the lower edges of the flanges forming the sides of the bars are teeth 36. The fish-backs are of substantially the same size and shape but the alternate ones 37 are fixed to the walls of the chute by means of bars 38 and 39, while the other fish-backs 40 are arranged to oscillate longitudinally over the material which is being fed into the mill.

The fish-backs 40 are rigidly fixed together by means of the bent straps 41 and 42. The inner strap 41 is supported by means of chains 43 which are suspended on a bar 44. The chains allow the movable fish-backs to rise freely when the feed is bulky. The bar 44 is rotatably mounted in the walls of the box 29 and the chain is fastened to the bar so that as the bar is rotated the chains will be elevated or lowered, as the case may be, so as to elevate or lower the inner ends of the fish-backs.

The rod 44 may be controlled in any suitable manner, such as by means of a nut 45 which, when tightened, prevents rotation of the rod but, when loosened, allows it to be rotated by means of the handle 46. By these means the elevation of the inner ends of the movable fish-backs can be adjusted suitably for the feeding means.

The rear or outer ends of the movable fish-backs are supported, by a rocking shaft 51, by means of arms 50, Fig. 11; so that, as the shaft 51 is rocked, the movable fish-backs are oscillated longitudinally over the material and the teeth on the lower edges of the movable fish-backs continuously force the material inwardly. At the same time, the teeth on the lower edges of the fixed fish-backs 37 prevent the material from moving rearwardly when the movable fish-backs are moved rearwardly. The fish-backs are inclined upwardly from the inner to the outer ends so as to allow the material to enter more freely between the fish-backs and the floor of the chute; and also, for this purpose, the outer ends of the fish-backs are bent still further upwardly.

The rod 51 is rocked by means of a shaft 55 which has fixed thereto an arm 56. As the shaft rotates, the link 57 is oscillated and thus the arm 58 fixed to the shaft 51 is rocked. This arm in turn rocks the shaft 51 and the arms 50 projecting downwardly therefrom. The shaft 55 and the shaft 28 are rotated by means of the shaft 60 upon which is mounted the driving wheel 61. Sprocket-wheel 62 drives the chain belt 63 which, by means of the wheels 64 and 65, operates the respective shafts 28 and 55. Wheel 61 is operated by a belt connecting the wheel with the pulley 65 mounted on the shaft 80.

The means for feeding liquids or finer material, such as molasses, shelled corn or threshed grain, into the grinding casing 15, comprises a hopper 19 which may be of any suitable shape, having a conduit 70 which passes into the casing and in the conduit is mounted a sliding valve 71, by means of which the rate of feed can be properly controlled. The conduit is closed at its lower end by means of an inclined wall 72 and has an opening 73 on the side. This arrangement is to properly direct the grain into the grinding mechanism.

The mechanism in the casing 15 is adapted to operate upon the material fed into the casing so as to produce various results, depending on the material itself and the condition of the material ultimately desired. The coarsest material, such as stalks, straw and hay are cut or ground as finely as may be desired. When corn stalks with the ears are fed, the stalks, cobs and corn are ground up. Grain, if desired, will be hulled and also ground as fine as may be desired. In order to produce these various results, I provide two co-operating cylinders 75 and 76, each of which has teeth projecting from the periphery thereof.

The cylinder 75 has teeth 77 which may be of any suitable shape. I prefer rectangular shaped teeth with square edges and corners, the teeth being of sufficient thickness to provide ample strength for the purpose. The cylinder 76 has teeth 78 which project from the periphery and these teeth, in general, have somewhat the same shape as the teeth 77, but the outer ends have steps 79 formed thereon so as to provide additional sharp edges and narrowed outer ends for purposes hereinafter described. The cylinder 75 is mounted on a shaft 80 and the cylinder 76 is mounted on a shaft 81.

These shafts may be rotated in any suitable manner. I prefer to operate the shaft 81 by means of a pulley 82 mounted on one end of the shaft 81, any suitable driving means being provided for operating this pulley. On the other end of the shaft 81 a pulley 83 operates a belt 84 and this belt, in turn, operates the shaft 80. The belt 84 passes over the idle pulleys 85 and 86 so as to provide the desired relative directions of rotation of the shafts 80 and 81 without twisting the belt, it being desired to rotate these shafts in opposite directions. The pulley 86 is supported by means of an arm 87 and a rod 88, and may be used to vary the tightness of the belt.

For grinding coarse material, the screen 105 and the baffle 106 are removed from the machine. The purpose of these elements will be explained hereinafter. As the coarse material passes into the casing 15, through the opening 90 between the fish-backs and the feeder-carrier, a plate 91 directs it over between the two cylinders. The cylinders are rotated in the directions indicated by the arrows. As they rotate in opposite directions, the adjacent teeth ends move in the same direction. The teeth carry the material forward between the two cylinders. The cylinders rotate at a very high rate. Preferably, the cylinder 75 rotates at about 2000 rotations per minute and the cylinder 76 at about 1500 rotations per minute. But my invention is not to be limited to these speeds. Inasmuch as the ratio of these rates is, preferably, substantially the same as the inverse ratio of the respective diametric distance between the outer ends of the cylinder teeth, the speeds of the outer ends of the teeth of the cylinders are substantially equal.

The arrangement of the feeding chute and the baffle plate 91 is such as to direct the roughage mainly against the teeth of the upper cylinder 75 and the high speed of these teeth, together with the shape thereof, causes the roughage to be broken, ground, and cut into short lengths. More or less of the roughage is carried along with the teeth and thrown against the baffle plates 92 and 93, where it is broken up into smaller particles. This material is again drawn into the teeth of the cylinder 75 and is further ground and cut. Finally, the material passes downwardly to the teeth 78 of the cylinder 76 and it is also ground and cut by these teeth striking it in mid-air and whipping it with great force against the surrounding walls. Such material as strikes the plate 92 is thrown back into the teeth of one of the cylinders and finally the material is thrown down against the grinding plate 94. The grinding plate 94 extends from one end to the other of the cylinder 76 and is curved and is substantially concentric with the cylinder 76. It has on its inner surface grinding projections 95. These projections are preferably pyramidal in shape. They may be dispersed over the surface of the plate in any suitable manner, preferably in rows with the projections in each row staggered with reference to the projections in the adjacent rows. The material being operated on is thrown at enormous speeds against these teeth of the plate 94, and it is thus ground into short pieces or, in case of grain, into fine particles, approximating flour if desired.

Beneath the cylinder 76 is mounted a suitable screen 100 which is also curved and substantially concentric with the cylinder and extends from one end to the other of the casing and is substantially flush with the inner surface of the plate 94. This screen comprises openings 101 disposed entirely over its surface so as to form a mesh of suitable size for the material being operated on. When the particles of material are as small as may be desired they are forced through the openings; and such material as fails to go through is forced again through the teeth and is again dashed against the grinding plate 94.

The screen 100 is removable and may be replaced by other screens having coarser or finer mesh, and thus the fineness of the ground material may be varied. In order to assist in the passage of the material through the opening and to prevent any tendency to clog I prefer to have the openings 101 inclined as indicated, so as to face substantially in the direction of the path of motion of the particles which are being thrown off by the teeth of the cylinder, but this is not an indispensable feature of my other inventions. By this arrangement, the particles will pass fairly through the openings, or they will be carried back again to the cylinder teeth.

As the material passes through the screen 100 it is directed by the walls of the casing 15 into the conduit 102 and thus into the hopper 20 from which it is carried upwardly by the elevator 21.

If it is desired, the screen 100 may be removed and the fodder may then be fed into the machine and cut up into suitable lengths for ensilage.

If it is desired to mix grain or other material with the roughage, it is fed into the casing by means of the hopper 19 and, as the grain passes out of the opening 72, it is directed by the baffle 93 into the teeth of the cylinder 75 and the enormous speed of these teeth not only hulls the grain, but also grinds it into small particles. The grain then passes down to the cylinder 76 where it is still further ground by the teeth 78 and the plate 94.

For some purposes it is desired to insert, beneath the cylinder 75, a screen 105 which is substantially concentric with the cylinder 75 and extends from the lower edge of the baffle 93 to the opposite side of the cylinder; and, in such a case, a baffle 106 is inserted. The baffles 93 and 106 prevent any of the grain from passing through the lower portion of the casing 15 without passing through the screen 105. In this way, the grain will not pass to the lower wheel until it has been properly ground by the cylinder 75.

By proper selection of the mesh of the screens 105 and 100, the grain may be ground as fine as may be desired. Although I do not desire to be limited to any particular mesh for either of these screens, yet, in practice, for grinding grain finely, I prefer the mesh of the screen 105 to be about $\tfrac{1}{16}$ of an inch and the mesh of the screen 100 to be about $\tfrac{1}{32}$ of an inch. When grain is operated on in this manner the hulls are removed by the cylinder 75, and may be passed out of the casing in any suitable manner.

In order to change the screens 100 and 105 they are made arcuate and are supported by the respective flanges 110 and 98. The screens can be slipped from these flanges and others substituted whenever desired. For this and other purposes, the upper portion of the casing 15 is hinged to the lower portion. Hinges 96 connect the two portions on one side, and clamps 97 on the other side normally hold the two portions together in operative position. By releasing the clamps and thus opening the casing the screens and other elements may be removed for any desired purpose.

The grinding plate 94 also is made removable and its position with reference to the cylinder 76 may be varied. To conveniently adjust its position, I provide a removable backing plate 111 with an arcuate inner edge having a radius of curvature corresponding to the outer surface of the plate 94. One of these plates 111 is fixed to each end of the casing 15 and, by means of a screw 112 threaded into a lug 113 fixed to the plate, the position of the backing plate 111, and thus the grinding plate 94, may be adjusted. Screws 114 are provided for holding each plate 111 firmly against the respective side of the casing.

The cylinders may be built up in any suitable manner. I prefer to form the cylinder 75 of pairs of disks 125, having registering slots 126. The inner ends of the teeth 77 are passed into these slots and the disks and teeth are firmly fixed together by bolts 127. An inner toe 128 assists in holding the teeth firmly in place. Bolts 129 connect the pairs of disks to form the complete cylinder.

The teeth of both cylinders are made reversible, so that when the edges of the teeth are worn or dulled on one side they may be reversed, or either cylinder may be removed and changed end for end so as to present the other edges of the teeth to the material.

The cylinder 76 is preferably built up by means of end plates 130 having recesses 131 in their peripheries. In these recesses are placed the respective ends of bars 132 and 133, and rings 134 are shrunk on the bars so as to hold them firmly in place. The teeth are then bolted on to the bars.

I prefer to make the outer ends of the teeth 78 with steps 79 not only in order to add additional cutting and grinding surface to the teeth but also to allow the roughage to slip off from the ends of the teeth, an action which would not be so effective if the steps were omitted and the outer end was full width. I find that the shape of teeth assists materially in preventing clogging and also in grinding the material. I also prefer to provide a projecting portion 116 with edges 115 which still further assists in the cutting process and in preventing clogging. One function of these projections 116 is to set up a draft which tends to blow the material outwardly from the teeth and into the path of the next tooth. A flange 120 mounted on the casing 15 encircles a portion of each end of the cylinder 76, disposed closely to the periphery of that portion of the cylinder, so as to prevent material from passing between the end of the cylinder and the casing wall, and winding around the shaft 81. And to assist in preventing this, I provide radial ribs 121 on the outer sides of the cylinder and plates. These ribs set up currents of air which continuously tend to prevent material from passing between the cylinder ends and the walls.

The chamber 103, between the plate 92 and the wall of the casing, provides a buffer for any abnormal air currents or air compression set up by the cylinder 76, driving the air through the screen 100. The compression of the air is relieved by the chamber so that the flow out into the elevator is more uniform. Abnormal air compression may be caused by temporary filling up or clogging of the elevator, and without the buffer chamber, the material might at such times belch out of the elevator outlet, or become permanently clogged.

In case of clogging in any portion of the machine, means are provided for reducing or stopping the feed. Clogging will reduce the speed of the mechanism, and, hence, of the pulley 61. This pulley is connected with the shaft 60 by a speed controller, which may be of any ordinary type, such as the controller 135. This controller is arranged so as to disconnect the pulley from the shaft when the speed is reduced, and thus to stop the feed until the clogging is overcome, and the mechanism again speeds up. As the weights 136 move inwardly under the action of the spring 137 and the reduced centrifugal force, the clutch is disconnected and the shaft will cease to operate.

Although the controller 135 cares for any undue clogging of the machine, whether in the feeder or elsewhere, yet, to prevent injury to the machine in case of breakage of the feeder belt 26 because of clogging or for any other reason, I arrange the mechanism so that no portion of the belt or of the feed carrier can pass into the grinding chamber. The shaft 28 for driving the feed carrier is located beneath the chain belts between the idle carrier sprocket-wheels 27, and as the greatest stress on the belt is between the driving shaft 28 and the inner wheels 27, any rupture would occur there and the belt would at once cease operating. The arrangement is such that the belts are pushed instead of pulled, if a rupture occurs, and hence, no portion can be forced into the chamber.

The position of the screen 100 may be adjusted so as to vary its distance from the outer ends of the teeth 78. For this purpose, the arcuate flanges 110 on opposite sides of the screen are shifted by means of cams 140 positioned in slots 141 in flanges 142 fixed to the outer arcuate flanges 110. The two arcuate flanges are fixed together and by rotating the cams, these cams are shifted towards or away from the cylinder, carrying with them the screen. The cams may be rotated by means of arms 143 fixed to the cam shafts 144, and the cams may then be fixed in position by nuts 145 threaded on the shafts 144 outside of the casing. The upper edge 146 of the screen is held in any position from being forced away from the cylinder by the flange 147.

I claim as my invention:

1. A mill comprising a casing, a cylinder rotatably mounted in said casing, means for rotating said cylinder, and teeth projecting from the surface of said cylinder, each of said teeth being flat and having steps in its edges at its outer end, and said teeth having V shaped flanges on their sides.

2. In a grinding mill, a casing, a toothed cylinder rotatably mounted in said casing, a grinding plate mounted between a portion of said cylinder and said casing wall, an arcuate flange projecting from said casing over the periphery of said cylinder and adjacent thereto and between said cylinder and plate, and ribs on the ends of said cylinder adapted to force air outwardly between said flange and cylinder.

In testimony whereof, I hereunto set my hand.

JOSEPH E. ROSENFELD.